| United States Patent [19] | [11] 3,874,574 |
| --- | --- |
| Heise | [45] Apr. 1, 1975 |

[54] PANNIER FOR CYCLES

[76] Inventor: Victor Heise, 73, Place des Ecoles, 62350 Saint Venan, France

[22] Filed: Sept. 20, 1973

[21] Appl. No.: 398,979

[30] Foreign Application Priority Data

Sept. 25, 1972 France .............................. 72.33828

[52] U.S. Cl................ 224/31, 190/18 R, 224/32 A
[51] Int. Cl.............................................. B62j 9/00
[58] Field of Search............ 224/31, 32 R, 39 R, 44, 224/43, 46 R, 30 R; 190/42, 18 R; 206/72; D87/1, 5 B, 5 F; 220/DIG. 13; 280/202

[56] References Cited
FOREIGN PATENTS OR APPLICATIONS

| 77,333 | 3/1954 | Denmark .............................. 224/32 |
| 82,437 | 9/1953 | Norway.............................. 224/30 R |
| 22,688 | 10/1912 | United Kingdom................ 224/39 R |

*Primary Examiner*—Robert G. Sheridan
*Assistant Examiner*—Jerold M. Forsberg
*Attorney, Agent, or Firm*—William Anthony Drucker

[57] ABSTRACT

A pannier is intended for fixing removably to a cycle rear luggage carrier of that kind having a horizontal frame with crossbars and supported by lateral uprights for connection to the two legs of a rear fork of the cycle. The pannier has a transverse vertical section which is substantially in the form of an inverted L. The horizontal upper part of the L is fitted with means for fixing to the frame of the luggage carrier, said fixing means comprising upper strips to engage under cross-members of said frame. The vertical lower part of the pannier carries a lower strip to engage the inner surface of an upright of the luggage carrier.

6 Claims, 2 Drawing Figures

PANNIER FOR CYCLES

The invention relates to a rigid pannier to be attached to the rear luggage carrier of a cycle, in particular a bicycle or moped, consisting of a horizontal frame that is in general provided with cross-pieces and supported by lateral uprights connected respectively to the two branches of the rear fork of the cycle.

As a rule, such panniers are designed and arranged so that they can be fitted and arranged conveniently and rapidly without the help of any tool, thanks to suitable means of attachment to the luggage holder, but they scarcely lend themselves to being held in the user's hand and to being filled as the latter makes purchases, finally to be removably attached to the cycle for transport.

It is the object of the present invention to provide a pannier of the type in question which avoids the drawbacks of the conventional panniers and is very rigidly attached to the luggage holder once it is mounted on the latter.

For this purpose, the pannier according to the invention has a transverse vertical section substantially in the shape of an inverted L, whose upper horizontal part is provided with a gripping handle and with means for fixing it to the frame of the luggage carrier, comprising upper strips which fit under the said frame, while the rest of the pannier, which extends vertically, is provided with a lower strip which engages the inner surface of the corresponding upright of the luggage carrier.

In an advantageous form of construction, the upper strips for fixing the pannier to the frame of the luggage carrier comprise a bent strip attached longitudinally against one extremity of the lower surface of the upper part of the pannier and having a part intended for insertion under a first transverse side of the frame of the luggage carrier, and another part designed to bear on the inside portion of the first transverse side of the frame and against the inner portion of the corresponding longitudinal side of the said frame, and another strip or tab which is removable and fits against the inner surface of the second transverse side of the frame of the luggage carrier in a slot of corresponding dimensions made in a boss also integral with the inner surface of the upper part of the pannier and situated against the inner portion of the said second transverse side of the frame of the luggage carrier, and also against the inside portion of the corresponding longitudinal side of this frame, the lower strip or tab for attachment being directed in the same direction as that of the upper fixed strip.

The invention will be better understood by reference to the following description with reference to the accompanying drawings which show a non-restrictive example of improved cycle pannier according to the invention.

In these drawings.

Figures 1, 2:
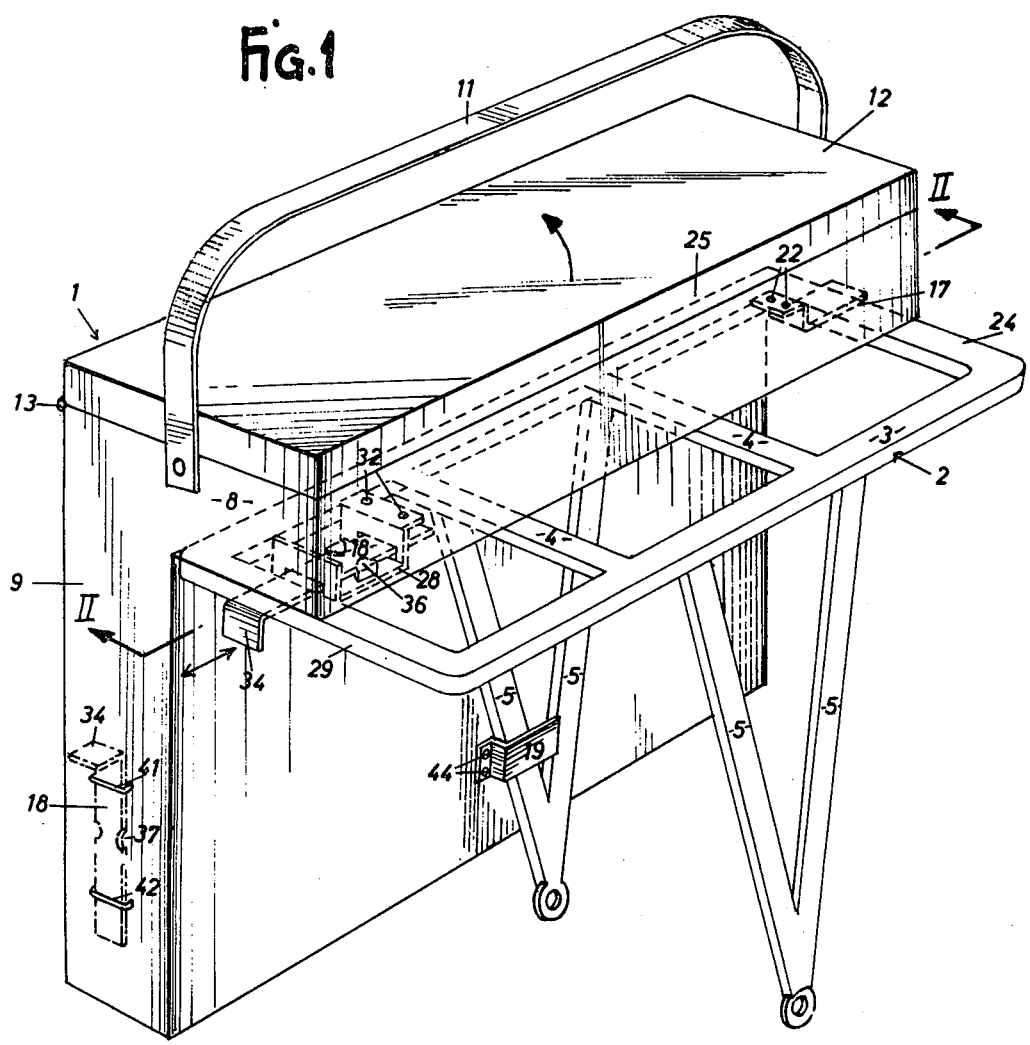
FIG. 1 shows in perspective the pannier in position on a luggage carrier.
FIG. 2 shows a partial longitudinal vertical section along the line II—II of FIG. 1.

The pannier is denoted as a whole by reference numeral 1 in FIG. 2, and is designed and devised to be attached to a luggage carrier 2 of a cycle, such as a bicycle or a moped, comprising a conventional rectangular horizontal frame 3 fitted with cross-pieces 4 and on each side two diagonal uprights 5 whose lower ends are designed to be connected to the two branches of the rear fork of the cycle.

The pannier 1, which is rigid, has a vertical cross-section substantially in the form of an inverted L, thus forming a horizontal upper part 8 which rests on top of the frame 3 of the luggage carrier and a vertical side part 9 situated against the corresponding lateral uprights 5 of the luggage carrier. In the example shown, the upper part 8 of the pannier has a width that is substantially equal to half the width of the frame 3 of the luggage carrier, so that it is possible to arrange on the other side thereof another pannier symmetrical to the first one. The width of the upper part of the pannier could also be less than half the width of the luggage carrier, or else greater should it only be desired to instal one pannier.

The pannier 1 is fitted with a handle or grip 11, of any suitable design, by which it is conveniently possible to carry the pannier, even when the latter is crammed with rather heavy objects. In the example shown, it is also fitted with a lid 12, mounted for instance by means of a hinge 13.

The pannier is fixed to the luggage carrier by three tabs or strips, viz. an upper fixed strip 17 (see also FIG. 2), an upper detachable strip 18, and a lower fixed strip 19.

The upper fixed strip 17 consists of a bent plate fixed, for instance by two rivets 22, to the inner surface of the upper part 8 of the pannier. It is orientated longitudinally and bears both on the lower surface of a first small transverse side 24 of the frame 3 of the luggage carrier, on the inner portion of the said side and also on the inner portion of the long side 25 of the frame of the luggage carrier, to ensure the positioning of one end of the upper part of the pannier, both longitudinally, laterally and in height.

The other removable upper strip or tab 18 ensures the same positioning of the other extremity of the pannier. For this purpose, it consists of a strip of metal engaged in corresponding slits in a saddle integral with the inner surface of the upper part 8 of the pannier and it bears on the inner surface of the second small side 29 of the frame of the luggage carrier, while the saddle is in contact with the inner portion of the said small side and also that of the long side 25 of the luggage carrier frame. The saddle 28 consists in this example of a suitably curved piece of metal strip fixed, also for instance by means of two rivets 32, against the lower surface of the upper part 8 of the pannier. The extremity of the strip or tab 18 is curved as shown at 34, so that it is conveniently possible to remove it from the saddle 28, when it is desired to remove the pannier from the luggage carrier.

So that the removable upper locking strip 18 is prevented from dropping while the cycle is in motion, it is locked resiliently by two small lugs 36 punched up from the bottom of the boss 28 and engaging in two corresponding notches 37 made in the side edges of the strip 18. To prevent the loss of this strip when the pannier is not in position on the cycle, means are provided for stowing it on a small surface of the pannier, said means consisting of two horizontal staples 41, 42 arranged one above the other and in which the strip 18 is inserted and secured therein by its bent end 34 which rests on the upper staple 41.

The lower strip or tab 19 also consists of a small bent plate of metal attached to the vertical surface (longitudinal inner surface) of the lower part 9 of the pannier, for instance by means of two rivets 44.

The way in which this pannier is used is obvious: when it is in position as shown in the drawings, its upper part is rigidly attached to the upper part of the luggage carrier by the two strips or tabs 17 and 18 which prevent it from moving in relation to the latter in all directions, and its lower part is secured by the strip 19 which prevents it from moving away from the uprights 5 of the luggage carrier. To remove the pannier, it suffices to extract the removable strip 18 by drawing it by its bent end 34, and to stow it at once by inserting it in the two staples 41, 42 after which all that remains to be done is to lift the pannier slightly at the side which carries its saddle 28 and move it slightly in a longitudinal direction in the direction of the arrow (FIG. 2) to free the fixed tab or strip 17 on the short side 24 of the luggage carrier, while at the same time the lower strip 19 is freed from the uprights 5 of the luggage carrier. To replace it in position, the reverse operations are performed and in the reverse order, i.e., there are first of all inserted the fixed upper and lower strips 17 and 19 by a longitudinal movement, after which the part of the pannier which carries the saddle 28 is lowered slightly so that it fits in the frame 3 of the luggage carrier; all that remains to be done is to grasp the removable strip 18 stowed in the flanges 41 and engage it in the slots of the saddle 28 to lock the pannier firmly.

The invention is not confined to the form of construction described and illustrated, and modifications may be made to it according to the applications that are envisaged, without departing from the scope of the invention as defined by the following claims.

I CLAIM:

1. A pannier type device, for fixing removably to a cycle rear luggage carrier of the kind having a horizontal frame with crossbars and supported by lateral uprights for connection to two legs of a rear fork of the cycle, said device having a transverse vertical section substantially in the form of an inverted "L" whose horizontal upper part is fitted with means for fixing to the frame of the luggage carrier, said fixing means comprising upper strips to engage under cross members of said frame, the vertical lower part of the device carrying a lower strip to engage the inner surface of an upright of the luggage carrier, wherein a first of said upper strips for fixing the device to the frame of the luggage carrier comprises a bent plate attached longitudinally to an extremity of the lower surface of said upper part of the device and having a part to engage under a first transverse side member of the frame of the luggage carrier and another part to bear on the inner surface of the said first transverse side of the frame and against the inner portion of the longitudinal side of the said frame corresponding thereto, and wherein a second of said upper strips in detachably connected to the lower surface of the upper part of the device and situated against the inner and lower portion of the said second transverse side member of the frame of the luggage carrier and also against the inner portion of the corresponding longitudinal side of this frame, said lower attachment strip pointing in the same direction as said fixed upper strip.

2. A pannier, according to claim 1, wherein said removable strip has a bent end for gripping, and wherein one of the vertical surfaces of the pannier has two horizontal staples for receiving said removable strip, arranged one below the other to receive the removable strip whose bent extremity is secured by the upper staple during the periods when the pannier is not in place on the cycle.

3. A pannier, according to claim 2, wherein said removable strip has in at least one of its sides a notch in which there engages resiliently a lug of the saddle, for locking said strip while the pannier is in position on the luggage holder.

4. A pannier, according to claim 1, wherein the width of the upper part of the pannier is at most equal to half the width of the luggage carrier so that two symmetrical panniers can be mounted on said luggage carrier.

5. A pannier, according to claim 1, wherein the width of the upper part of the pannier is at most equal to half the width of the luggage carrier so that two symmetrical panniers can be mounted on said luggage carrier.

6. A pannier, according to claim 2 wherein the width of the upper part of the pannier is at most equal to half the width of the luggage carrier so that two symmetrical panniers can be mounted on said luggage carrier.

* * * * *